United States Patent [19]

Schilling

[11] Patent Number: 5,119,510
[45] Date of Patent: Jun. 9, 1992

[54] INSECT-PROOF GARMENT

[76] Inventor: Yvonne M. Schilling, 631 N. 61st St., Wauwatosa, Wis. 53213

[21] Appl. No.: 606,528

[22] Filed: Oct. 31, 1990

[51] Int. Cl.⁵ .................................................. A42B 3/00
[52] U.S. Cl. ................................................ 2/4; 2/84; 2/202
[58] Field of Search ................. 2/4, 22, 94, 108, 202, 2/2, 69, 84, 85

[56] References Cited

U.S. PATENT DOCUMENTS

| | | | |
|---|---|---|---|
| 499,965 | 6/1893 | Bushnell | 2/4 |
| 3,187,344 | 6/1965 | Porcello | 2/84 |
| 3,496,572 | 2/1970 | Herzig | 2/2 |
| 3,698,014 | 10/1972 | Little | 2/202 |
| 3,783,451 | 1/1974 | Malin | 2/4 |
| 4,214,318 | 7/1980 | Gomez | 2/4 |
| 4,369,528 | 1/1983 | Vest | 2/69 |
| 4,395,781 | 8/1983 | Myers | 2/4 |
| 4,422,184 | 12/1983 | Myers | 2/4 |
| 4,497,071 | 2/1985 | Bell | 2/94 |
| 4,685,152 | 8/1987 | Heare | 2/4 |
| 4,716,594 | 1/1988 | Shannon | 2/4 |
| 4,756,026 | 7/1988 | Pierce | 2/22 |
| 4,979,236 | 12/1990 | Merrill | 2/4 |
| 4,985,933 | 1/1991 | Lemoine | 2/4 |
| 5,005,215 | 4/1991 | McIlquham | 2/4 |

FOREIGN PATENT DOCUMENTS

| | | | |
|---|---|---|---|
| 267858 | 5/1976 | U.S.S.R. | 2/4 |
| 884668 | 11/1981 | U.S.S.R. | 2/4 |

Primary Examiner—Werner H. Schroeder
Assistant Examiner—Diana L. Biefeld
Attorney, Agent, or Firm—Foley & Lardner

[57] ABSTRACT

An insect-proof garment formed from NO-SEE-UM TM netting and including a jacket with a hood enclosing the head of the wearer, a pair of pants and leggings for enclosing feet of the wearer.

11 Claims, 4 Drawing Sheets

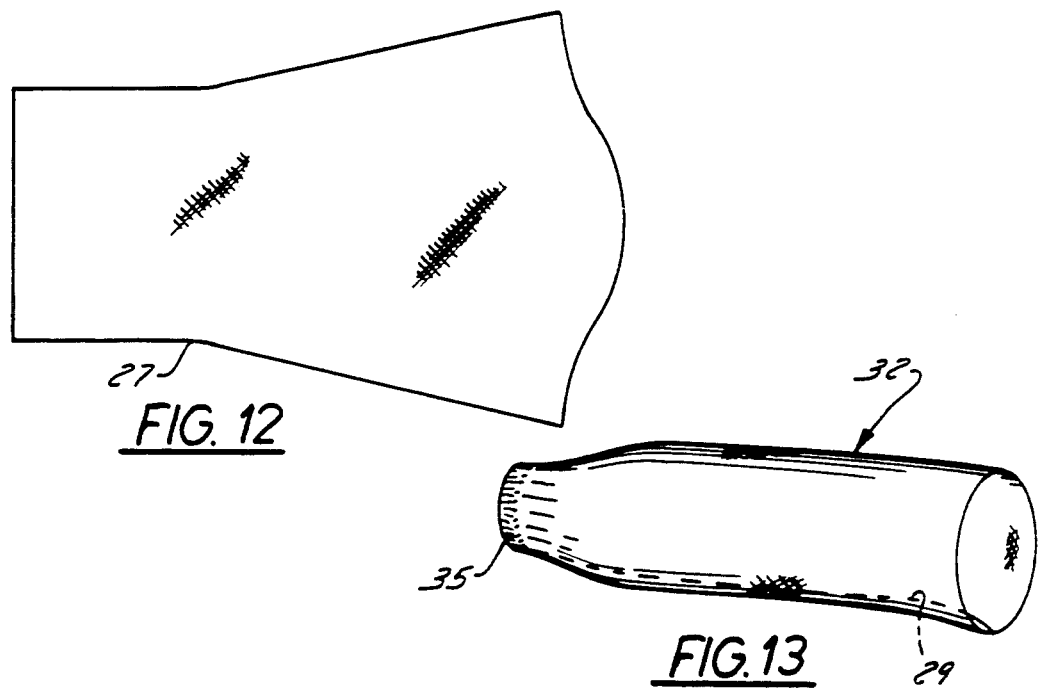
FIG. 12
FIG. 13
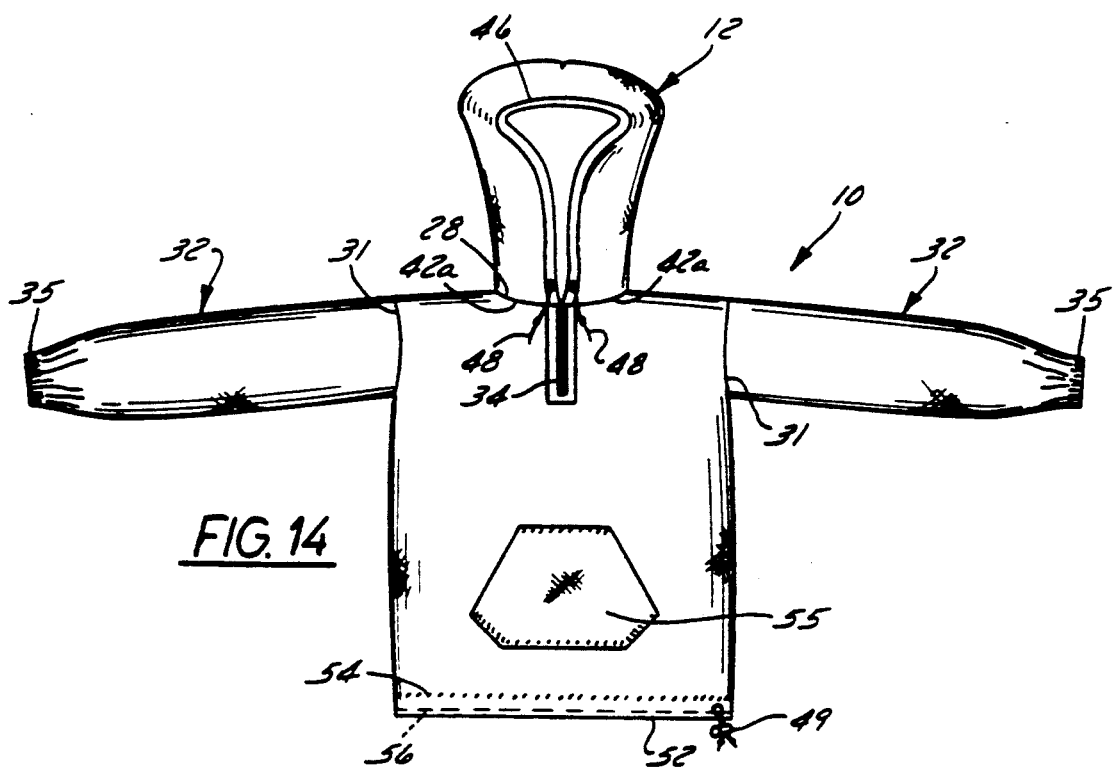
FIG. 14

INSECT-PROOF GARMENT

FIELD OF THE INVENTION

The present invention relates to outer wear for protecting people from biting insects and more particularly to a body suit formed from a mesh material which protects the wearer from mosquitos, gnats, deer ticks and the like.

BACKGROUND OF THE INVENTION

Venturing outdoors to hike, fish or hunt has always been dependent to some extent on the presence of biting insects. The most common protection from such attacks has been insect repellent of various kinds which are sprayed on clothing and exposed portions of the body. Various types of protective clothing made of mosquito netting material have been used to protect the hands and face and, to some extent, the overall body of the particular individual. These devices generally attach mesh materials to common clothing such as jackets and pants, which do not allow for circulation of air. A mesh jacket having a hood is shown in a U.S. Design Pat. No. 306,091 issued on Feb. 20, 1990, and entitled "Mosquito Net Jacket." However, the hood as shown is stitched directly to the neck of the jacket which restricts the available space in the hood.

SUMMARY OF THE PRESENT INVENTION

The present invention advantageously provides an improved mesh outfit including a complete mesh body suit which minimizes the ability of insects such as mosquitos, chiggers, no-see-ums, black flies, gnats, and deer ticks, from penetrating the suit. The mesh suit of the present invention is designed to provide protection from all but the smallest insects presently known to outdoorsmen and has been successfully tested against penetration by the deer tick, the carrier of Lyme disease. The mesh used to form the suit is a mesh material generally known as a NO-SEE-UM ™ mesh made by T. W. Textiles, 1016 1st Avenue South, Seattle, Wash., 98104. This material has been used primarily for tent openings.

The invention includes a jacket, pants, leggings, and a hood which, when worn, encases the wearer from the top of the head to the top of the shoe in a mesh netting. More particularly, the hood has been designed to be stored on the back of the neck and quickly and easily pulled over the head of the wearer and closed to protect the face and neck. The hood does not interfere with the ability of the wearer to observe the normal field of vision while providing complete protection of the head of the wearer. The hood is advantageously formed from a single panel of mesh material which is pleated at the back to conform to the shape of the back of the neck but allows for expansion of the hood at the back which provides sufficient space for the user to wear a cap or hat. The leggings are provided to protect the top of the shoes or boots from penetration by insects. Stirrups are provided on the bottom of the leggings which prevent the leggings from creeping upward to expose the top of the feet or boots.

Other principal features and advantages of the invention will become apparent to those skilled in the art upon review of the following drawings, the detailed description and the appended claims.

DETAILED DESCRIPTION OF THE DRAWINGS

FIG. 12 is a plan view of the arm panel.

FIG. 13 is a perspective view of one of the arms.

FIG. 14 is a plan view of the jacket.

Figure 4:
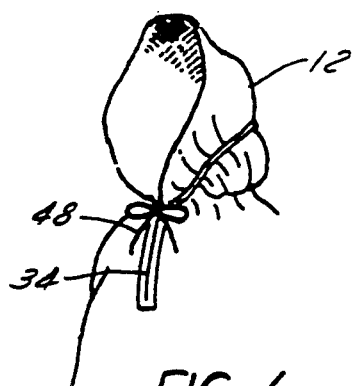
FIG. 4 is perspective view of the hood.
Figure 1:
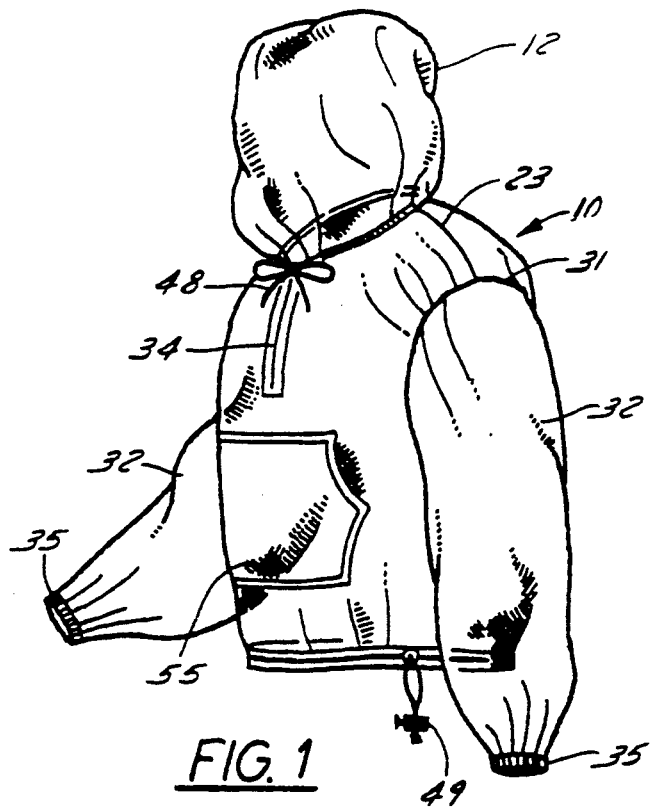
FIG. 1 is a perspective view of the jacket and hood according to the present invention.
Figure 2:
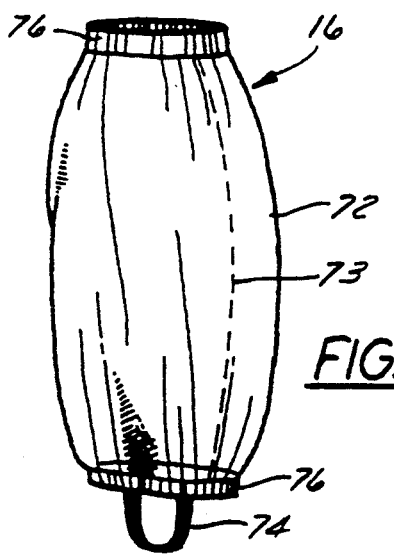
FIG. 2 is a perspective view of the leggings according to the present invention.
Figure 5:
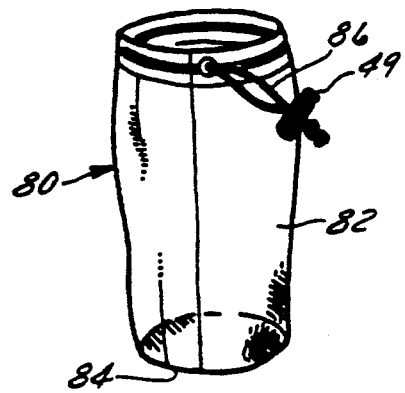
FIG. 5 is a perspective view of the storage bag for the suit.
Figure 3:
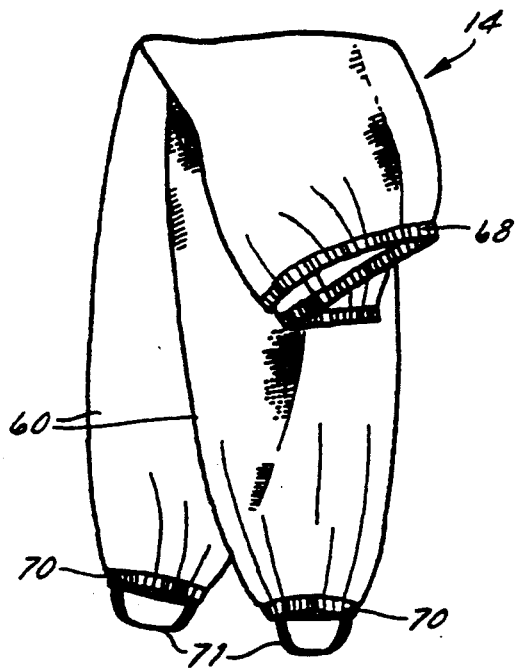
FIG. 3 is a view of the pants according to the present invention.
Figure 6:
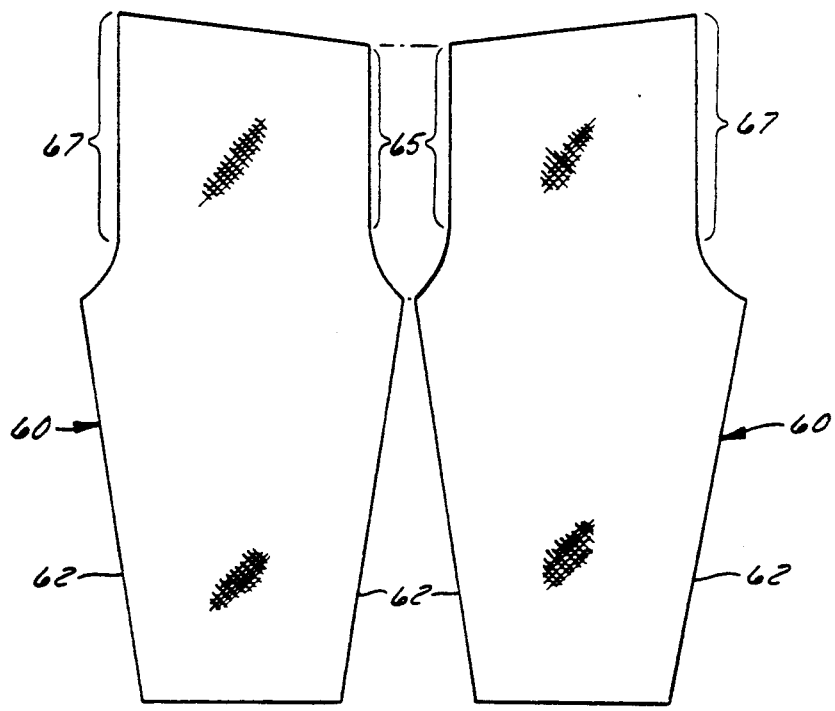
FIG. 6 is a plan view of the panels for the pants.
Figure 7:
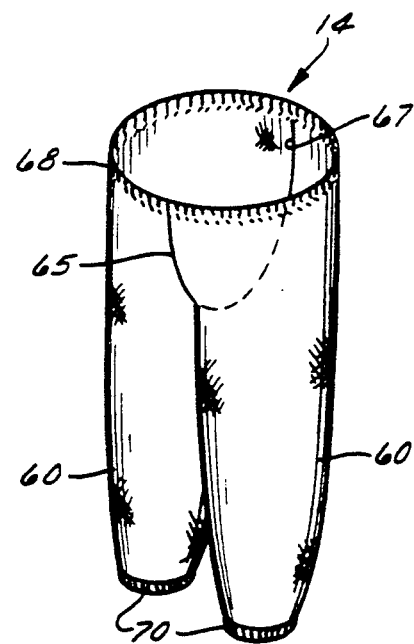
FIG. 7 is a perspective view of the pants.
Figure 8:
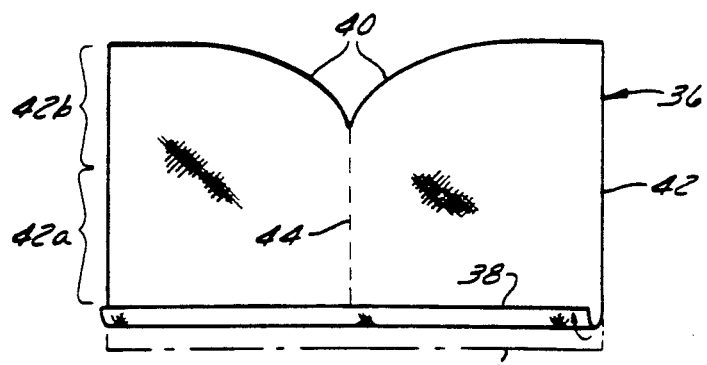
FIG. 8 is a plan view of the hood panel.
Figure 9:
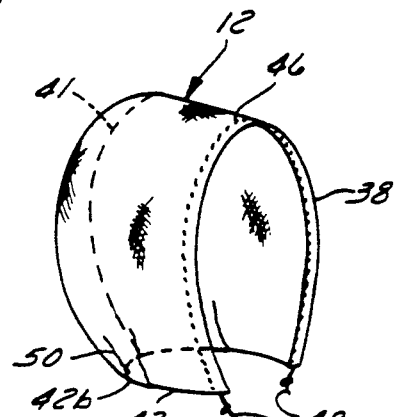
FIG. 9 is a perspective view of the hood.
Figure 9A:
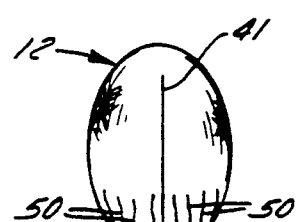
FIG. 9A is a perspective view of the back of the hood.
Figure 10:
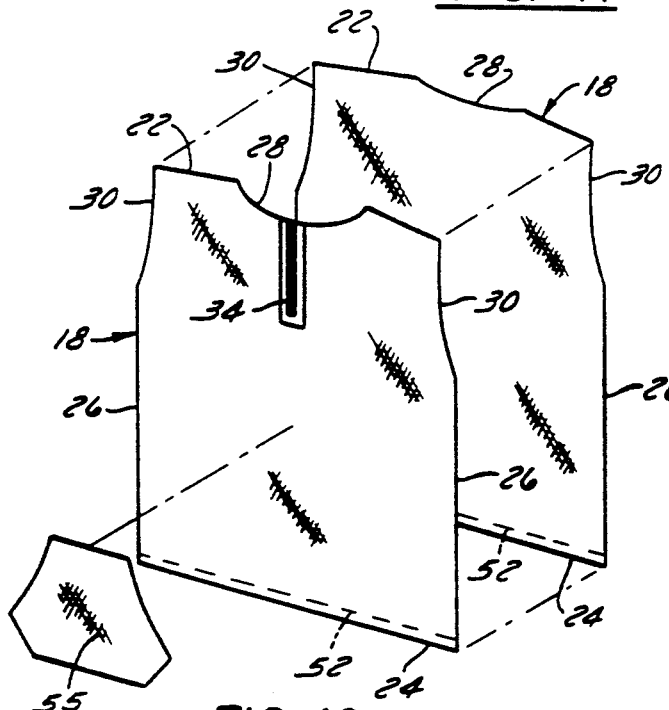
FIG. 10 is an exploded perspective view of the jacket panels.
Figure 11:
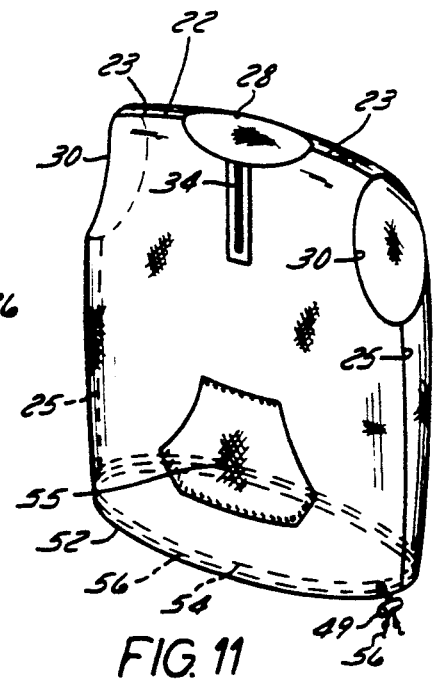
FIG. 11 is a perspective view of the body of the jacket.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The mesh suit according to the present invention includes a jacket 10 having a hood 12, a pair of trousers 14, and a pair of leggings 16. Each of these articles of clothing are formed from a mesh material commonly referred to as a NO-SEE-UM ™ mesh of very fine quality. The mesh has been tested to resist penetration by mosquitos, chiggers, no-see-ums, black flies, gnats, and the deer tick. This latter insect is more commonly known for spreading Lyme disease. The mesh material has been successfully tested for penetration by the nymph stage of the deer tick which is the most aggressive biter.

The jacket 10 is formed from substantially identical front and back panels 18, respectively. Each panel includes a top edge 22, bottom edge 24, and side edges 26. A neck opening 28 is provided in the top edge 22 of the front panels 18, and arm openings 30 are provided in the side edges 26. The top edges 22 are stitched together between the neck opening 28 and arm openings 30 to form a seam 23 across the shoulders of the jacket. The side edges 26 are stitched from the arm openings 30 to the bottom edge 24 to form seams 25 which enclose the sides of the jacket 10.

Each of the arms 32 of the jacket are formed from single panels 27 which are stitched to form a seam 29. The panels 27 are stitched to the panel openings 30 in the edges 26 to form seams 31. An elastic band 35 is provided at the ends of the arms 32. It should be noted that the arms 32 are extra long so that the hands can be enclosed in the arms by bands 35. A zipper 34 is provided in the front panel at the center of the neck opening 28. The bottom edges 24 are folded over at 52 and stitched to form seams 54 for drawstring 56. A cord lock 49 is provided on drawstring to provide a snug fit. A pouch 55 is provided at the front of the jacket to protect the hands.

The hood 12 is formed from a single panel 36 having a front edge 38, arcuate back edges 40, and neck edges 42. The hood panel 36 is folded in half along line 44. The back edges 40 are stitched to form a seam 41 which encloses the back of the hood. A seam 46 is provided in the front edges 38 of the hood to enclose a drawstring 48. The edges 42 are separated into a front section 42a and a back section 42b. The back section 42b of the panel 36 is pleated to form four seams 50 on each side of the seam 41. The pleats provide for expansion of the hood at the back. The pleated edges 42b are then stitched to the edges 28 in the back panel. It should be noted that when the drawstring 48 is pulled to close the front of the hood, the hood is pulled completely over the head and face of the wearer. A cord lock may be provided on the drawstring 48 to provide a snug fit.

The trousers 14 are formed from two identical panels 60 which are stitched along the edges 62 of the leg sections 64 to form seams along the leg sections of the trousers. The trunk sections 63 are stitched in the front and back to form seams 65 and 67. Elastic bands 68 and 70 are provided at the waist and at the bottom of the trouser legs respectively. Stirrups 71 are provided at the bottom of the trousers, which are wrapped around the bottom of the feet to hold the trouser legs in the shoes or boots.

The leggings 16 are formed from single panels 72 which are stitched along one edge to form a seam 73. Elastic bands 76 are provided at the top and bottom of the leggings. A stirrup 74 is provided at the bottom of the leggings which fit inside or around the shoes. The leggings are used to provide double protection to the bottom of the legs by pulling the leggings over the top of the boots so that the upper band 76 encloses the calf of the leg to protect the top of the shoes from entrance by insects.

A carrying case 80 may be provided for storing the mesh suit. The case is formed from a single panel 82 of mesh material stitched along one side to form a tube. A bottom panel 84 is sewn to one end of the tube and a drawstring 86 is sewn into the other end of the panel with a cord lock on the drawstring.

Thus, it should be apparent that there has been provided in accordance with the present invention a bug out outerwear that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An insect-proof garment formed from a uniform, single layer fine mesh mosquito netting, comprising:
   a jacket having identical front and rear panels, each of said panels including a neck section and a pair of arm sections, said panels being attached to each other between said neck sections and said arm sections and between said arm sections and the bottom edge of said panels;
   a hood formed from a single panel of mesh material folded in half at the top of the hood, each half having an arcuate edge at the back and a straight edge at the front and a bottom edge, said arcuate edges being attached to form a seam at the back of the hood, said bottom edges at the front of each half being attached to the neck section of the front panel, and said bottom edges at the back of the panel being pleated and attached to the neck section of the back panel; and
   an arm panel attached to each of the arm sections on each side of the front and back panel.

2. The garment according to claim 1 wherein said straight edge at the front of said hood includes a drawstring to completely enclose the front of said hood.

3. The garment according to claim 2, including a pair of trousers formed of mesh material, said trousers including an elastic band at the top and an elastic band at the bottom of each leg.

4. The garment, according to claim 3, including a pair of leggings, each legging including an elastic band at each end and a stirrup at the bottom of each legging.

5. The garment according to claim 3 including a stirrup attached to said elastic band at the bottom of each leg to encircle the foot of a wearer.

6. The garment according to claim 2, wherein each of the arms includes an elastic wrist band.

7. The garment according to claim 2, including a pouch at the front of the front panel to protect the hands of the wearer.

8. The garment according to claim 1 wherein each said arm section has an elongated length capable of enclosing the hand of a wearer.

9. A garment for protecting the head and body of a wearer from biting insects, said garment comprising:
   a jacket and
   a pair of trousers, and
   a hood secured to said jacket, said hood being formed from a single panel of mesh material and having a drawstring sewn into the front of said hood to enclose the front of said hood and a series of pleats in the back of the hood for attachment to the jacket, and wearable in drawn fashion completely covering the head, partially covering the head with the face exposed or withdrawn completely from the head,
   said jacket and trousers also being formed of a one piece, single layer mesh material having openings of a size to prevent penetration by the deer tick.

10. The garment, according to claim 9, including a pair of leggings, each having an elastic band on each end and a stirrup at the bottom to encircle the foot of the wearer.

11. An insect-proof garment formed from a uniform, single layer mosquito netting comprising a jacket having front and rear panels, each of said panels including a neck section and an arm section on each side,
   said panels being attached to each other between said neck sections and said arm sections and between said arm sections and the bottom of said panels,
   a hood formed from a single panel folded in half at the top of the hood, each half having an arcuate edge at the back and a straight edge at the front, said arcuate edges being stitched to form a seam at the back of the hood,
   each half of said panel being attached to the neck section of said front panel, and
   said hood panel being pleated at the back and attached to the neck section of said back panel, and
   an arm panel attached to each of the arm sections on each side of the front and back panels.

* * * * *